United States Patent [19]

Lytkin et al.

[11] 4,379,078

[45] Apr. 5, 1983

[54] PROCESS FOR PRODUCING GRANULATED CATALYST FOR THE SYNTHESIS OF AMMONIA

[76] Inventors: Viktor P. Lytkin, ulitsa Trudovye Rezervy, 70b, kv. 95; Vladimir N. Menshov, ulitsa Berezhnogo, 21, kv. 24; Jury S. Frolov, ulitsa Kuibysheva, 14, kv. 26; Zinaida A. Polikarpova, ulitsa Kommunisticheskaya, 23a, kv. 19; Viktor S. Sobolevsky, ulitsa Moskovskaya, 2/14, kv. 5; Maria G. Seljutina, ulitsa Jubileinaya, 3, poselok "25 let Khimkombinata"; Vladimir N. Anokhin, ulitsa Berezovaya, 9, kv. 2; Nikolai D. Barbosov, ulitsa S. Esenina, 3, kv. 22, all of Novomoskovsk Tulskoi oblasti, all of U.S.S.R.; Sergei P. Vorontsov, deceased, late of Novomoskovsk Tulskoi oblasti, U.S.S.R.; by Nina F. Vorontsova, administrator, ulitsa Moskovskaya, 20, kv. 60., Novomoskovsk Tulskoi oblasti, U.S.S.R.; David B. Chistozvonov, deceased, late of Novomoskovsk Tulskoi oblasti, U.S.S.R.; by Vera G. Chistozvonova, adminstrator, ulitsa Kirova, 4/23, kv. 51., Novomoskovsk Tulskoi oblasti, U.S.S.R.

[21] Appl. No.: 225,507

[22] Filed: Jan. 16, 1981

[51] Int. Cl.$^3$ .......................... B01J 21/04; B01J 23/78
[52] U.S. Cl. .................... 252/466 J; 252/473; 252/474; 423/362
[58] Field of Search ................. 252/466 J, 472, 473, 252/474; 423/362

[56] References Cited

U.S. PATENT DOCUMENTS 4,073,749  2/1978  Passariello ................. 252/466 J

FOREIGN PATENT DOCUMENTS 1300520  8/1969  Fed. Rep. of Germany ... 252/466 J
 196643  6/1967  U.S.S.R. ........................... 252/466 J Primary Examiner—W. J. Shine
Attorney, Agent, or Firm—Ladas & Parry

[57] ABSTRACT

A process for producing a granulated catalyst for the synthesis of ammonia which comprises simultaneous melting and oxidation of iron using promotors in a thin layer of a melt of the resulting catalyst mass, granulation of said melt by a stream of air ensuring a horizontal movement of the formed granules and cooling thereof to the temperature of 1,000° C., whereafter the resulting granules are reduced by a reducing gas at their spontaneous cooling.

5 Claims, No Drawings

PROCESS FOR PRODUCING GRANULATED CATALYST FOR THE SYNTHESIS OF AMMONIA

FIELD OF THE INVENTION

The present invention relates to the art of inorganic synthesis and, more specifically, to a process for producing a granulated catalyst for the synthesis of ammonia and is useful in the industry of nitrogen.

BACKGROUND OF THE INVENTION

At the present time all industrial plants for the production of a molten iron catalyst for the synthesis of ammonia are based on three process schemes which contemplate the manufacture of a crushed and granulated catalyst.

As the starting product for the catalyst use may be made of iron, naturally-occurring or synthetic magnetite produced by oxidation of pure iron of the "Armco" type with additives of $K_2O$, $CaO$, $Al_2O_3$, $SiO_2$ and the like.

Since the catalyst quality depends to a considerable extent on purity of the starting materials, it is a common practice nowadays to make use of synthetic magnetite, wherein the content of harmful impurities (S, P, Cl, Cu, Ni and the like) is much lower than in naturally-occurring magnetite.

The first process scheme is based on the production of the catalyst from synthetic magnetite.

The production line consists in the following steps performed in succession: oxidation of the catalyst iron to magnetite by gaseous oxygen without the addition of promotors; cooling of the melt; crushing, in jaw and roll crushers, of the synthetic magnetite; grinding thereof in a ball mill; blending of synthetic magnetite with activators in a special mixer; melting of the catalyst charge in electric-resistance furnaces; cooling of the molten catalyst; crushing thereof in jaw and roll crushers and screening of the final ground catalyst to commercial fractions.

The most critical operations are the production of synthetic magnetite by way of oxidation of the catalyst iron with gaseous oxygen and melting of the prepared charge in electric-resistance furnaces.

All these numerous operations are performed discontinuously in the prior art processes (cf. U.S. Pat. No. 1,554,008; V. P. Kamzolkin, N. V. Kul'chitsky "Synthesis of Ammonia", Moscow, 1940; V. P. Lipinskaya in Col. "Scientific Foundations for the Selection and Manufacture of Catalysts", Published by U.S.S.R. Academy of Science Publishers, Siberian Division, 1964, Novosibirsk, p. 109).

The second production scheme for the manufacture of a molten catalyst for the synthesis of ammonia contemplates the use of a two-stage melting and involves six successive operations: melting of the catalyst iron in a crucible of an induction furnace; oxidation of the iron melt and addition of promoters in an oxidation crucible lined with magnesite bricks; cooling; crushing of the catalyst in jaw and roll crushers and screening of the final crushed catalyst to commercial fractions (U.S.S.R. Inventor's Certificate No. 206554, 1966).

This prior art production line operates in the following manner.

The catalyst iron is manually charged into an induction furnace crucible in the amount of 150 kg; therein, under the effect of high-frequency current it is melted and the resulting liquid metal is cast into an oxidizing crucible.

The oxidizing crucible comprises a spherical bath lined with refractory magnesite bricks. In the crucible conical portion a manhole is provided for maintenance and visual inspection of the process. Gaseous oxygen is fed into the crucible from the top.

The bottom portion of the oxidizing crucible is charged with the catalyst fines obtained from the preceding melting cycles along with the required amount of promotors.

The iron melted in the induction furnace is cast, by gravity, through a tapping hole into the prepared mould of the oxidizing crucible. Oxygen for oxidation is fed as soon as the liquid metal starts to fill the crucible.

An intensive oxidation of the molten iron and dissolution of promoters in the melt occur for 15–20 minutes.

After each oxidation operation a layer of the catalyst fines is again charged onto the crucible bottom along with promoters intermixed with the fines and this periodic process is repeated. The stages of cooling, crushing and screening of the catalyst are effected using conventional methods. Therefore, the above-described production schemes comprise a combination of certain discontinuous operations and are not suitable for automation, wherefore they feature a low efficiency.

Furthermore, the crushed catalyst produced in these processes when practically used for the synthesis of ammonia results in a non-uniform distribution of a gas stream, local overheatings in the column for the synthesis of ammonia and evolution of dust during handling and operation stages, thus impairing quality of the resulting ammonia and lowering productivity of the synthesis columns.

The third production scheme for the manufacture of the catalyst involves five successive operations: oxidizing melting of iron with promoters; granulation of the catalyst melt by means of an activating liquid; washing of the catalyst to remove the activating liquid; drying and screening of the catalyst.

The first operation in the production scheme is the oxidizing melting of iron with promoters which is conducted in a crucible with water cooling in a stream of gaseous oxygen (cf. U.S.S.R. Inventor's Certificate No. 38135, Cl. B 01 J 23/74, 1934; FRG Pat. No. 957475, 1957).

Oxidation of iron in this process is effected portionwise, while the required promoters are alternatively introduced into the melt after oxidation of each of the following portions. The resulting melt of the catalyst mass is poured from the crucible for 3–6 seconds. This rapid casting of the melt is explained by the fact that the reaction of the heat evolution upon oxidation of iron is completed and the catalyst mass may get cooled in the crucible which is considered as an emergency situation in the present stage.

The following stage, i.e: granulation of the molten catalyst mass obtained in the preceding stage is effected by feeding same into the activation liquid such as liquid potassium glass with the addition of potassium carbonate preliminary prepared in a separate unit and charged into a granulator. The molten catalyst mass is fed through spinnerets or a die plate with orifices intended for distribution of the melt stream to a number of thin jets and granulation.

Inside the granulator a rotary hollow drum is located which is half-immersed in the liquid; a stirrer for agitation of the activation liquid is also provided.

The molten catalyst mass from the crucible is poured within 3–6 seconds through a die plate onto the granulator drum (cf. U.S.S.R. Inventor's Certificate No. 177856, Cl. B01 J 11/12).

The molten catalyst mass is fed through the die plate is effected into a strongly turbulized stream of the activation liquid (cf. U.S.S.R. Inventor's Certificate No. 476018, Cl. B01 J 23/74, 1975).

The basic disadvantage of granulation of the molten catalyst into the activation liquid resides in a considerable difficulty of the production of a catalyst having a stable chemical composition during the manufacture due to dissolution of the catalyst promoters in the activation liquid and the inverse process of invasion of the activation liquid components into the catalyst. This phenomenon necessitates additional stages of washing the catalyst granules to remove the activation liquid and drying of the granules.

Due to the periodic character of the process of preparation of the molten catalyst mass, the granulation process in this production scheme is also batch-wise.

Furthermore, granulation of the molten catalyst mass at a temperature of at least 1,600° C. (which is the melting point of the catalyst mass) in an aqueous liquid may be accopanied, in the case of non-compliance with the process requirements, by a thermal decomposition of water with the formation of a fulminating mixture, thus always bearing the risk of explosion.

Consequently, all currently employed production schemes for the manufacture of a catalyst for the synthesis of ammonia feature a complicated multi-stage process technology which does not enable automation thereof and hinders a total mechanization and performance of discontinuous processes. Furthermore, granulation of the catalyst in a liquid which is effected in the third process scheme does not ensure a total safety of the process. All the industrial schemes for the production of the catalyst for the synthesis of ammonia are designed for its manufacture in the oxidized state. In the use of such a catalyst in the industry of nitrogen an additional operation is required, namely: reduction thereof to $\alpha$-Fe which should be carried out either in the synthesis column or in a special plant; this also entails certain additional capital expenses.

SUMMARY OF THE INVENTION

It is an object of the present invention to provide continuous processes in all stages of the manufacture.

It is another object of the present invention to improve safety of the catalyst produced, provide the catalyst in its reduced form and lower the cost of the catalyst manufacture.

These objects are accomplished by a process for the production of a granulated catalyst for the synthesis of ammonia which comprises simultaneous melting and oxidation of iron with the use of promoters in a thin layer of a melt of the resulting catalyst mass, followed by granulation of said melt with a stream of air ensuring a horizontal movement of the catalyst granules and cooling thereof to the temperature of 1,000° C., whereafter the thus-produced granules are reduced by a reducing gas upon their spontaneous cooling.

The process according to the present invention ensures continuous character and safety of both individual operations and the production line as a whole and enables the production of a catalyst possessing an improved quality and reduced production costs.

To ensure continuity of the process and a better quality of the catalyst produced, it is advisable that the thickness of the layer of the melt be within the range of from 30 to 70 mm and granulation be conducted under a pressure of the air stream of from 25 to 30 mm $H_2O$. At the melt layer thickness of below 30 mm the thermal conditions of continuous processes of melting and oxidation of iron, melting and dissolution of promoters in the resulting iron oxides are impaired thus causing crystallization of the melt and discontinuation of a continuous casting of the resulting melt of the catalyst mass. In the case where the melt layer thickness is above 70 mm, iron has not enough time to be oxidized and promoters have not enough time to become molten and dissolved in iron oxides.

To lower the catalyst production costs it is advisable to use, as the reducing gas, a nitrogen-hydrogen mixture of the composition (% by volume): hydrogen 75, nitrogen 25, or a purging gas from the production of ammonia containing, % by volume: hydrogen—65, nitrogen—15, $CH_4$—2, Ar—8, $NH_3$—10, or a converted gas from the synthesis of ammonia containing, % by volume: CO—4, $CO_2$—3, $H_2$—78, $N_2$—15.

DETAILED DESCRIPTION OF THE INVENTION

The process according to the present invention is performed in the following manner.

Since the continuous character of the manufacture of a granulated catalyst for the synthesis of ammonia totally depends on the continuous character of the stage of melting and oxidation of iron with the use of promotors with the formation of a melt of the catalyst mass, in the process according to the present invention this continuous character is ensured by simultaneous carrying out said operations in a thin layer of said melt with a thickness of from 30 to 70 mm in an oxidizing chamber.

The oxidizing chamber comprises a square-cross-section apparatus with water-cooled side walls, cover and a tapping hole. In the cover of the chamber there are mounted nozzles through which gaseous oxygen is fed for oxidation. Besides, in the cover there is provided a gas burner for the initial pre-heating of the crucible bottom and iron thereon; there are also provided feeders for dispensing iron and the mixture of promoters to the oxidation zone.

At the beginning, onto the chamber bottom small lumps of iron are placed and the bottom is heated by means of the gas burner and iron is brought to the temperature of 1,400° C. Then oxygen is fed through the nozzles and upon the formation of a thin layer of the melt over the entire surface of the chamber bottom with a thickness of, for example, from 30 to 70 mm and stabilization of the drain rate through the tapping hole, the iron feeding device is switched on along with the supply of the promoters and at a continuous delivery thereof melting and oxidation of iron is effected simultaneously in the presence of promoters.

The thin layer of the melt ensures not only a uniform distribution of promoters within the whole mass of the the catalyst but provides the possibility of simultaneous occurrence of three different processes of melting and oxidation of iron and dissolution of promoters. The intensity of the reaction of chemical oxidation of iron in a thin layer and the amount of heat evolved thereupon are sufficient to ensure a self-adjusting character of the melting process and, hence, its continuity.

These simultaneous operations of melting, iron oxidation with the use of promoters in a thin layer of the catalyst melt makes it possible to transform the conventional process for the production of a molten catalyst for the synthesis of ammonia to a continuous process readily controlled and featuring stable process parameters, readily automated and, consequently, highly efficient.

The power reserve for this stage of the catalyst preparation is sufficiently high and totally depends on the melt thickness; variation of the latter makes it possible to attain the power consumption for the conventionally employed stage of the commercial prior art process and surpass it by two times.

The provision of a continuous stage of the process of melting and oxidation of iron with simultaneous introduction of promoters into molten iron oxides has made it possible to solve the problem of the provision of a continuous granulation of the melt.

In the prior art processes granulation is effected with the use of forced-movement means: spinnerets, rotary drum, strongly turbulized stream of the activation liquid.

In the process according to the present invention there are no forced means; furthermore there is no contact between the catalyst mass melt and the liquid and, hence, the stages of washing of the resulting catalyst and drying thereof are eliminated, thus providing for a complete safety of the process.

Granulation of the catalyst mass melt effluent from the oxidation chamber in a continuous stream is effected by means of a current of air ensuring the horizontal movement of the produced granules and cooling thereof to the temperature of 1,000° C. The horizontal movement of the resulting granules is ensured in different ways: either by pressure of the current of air, or by variation of its direction. The melt jet is broken to drops without use of any forced-movement means only by gravity and surface-tension forces; these drops continue the horizontal movement and continuously pass to the following process stage.

Under the conditions of the horizontal movements in the obtained granules there starts an intensive process of crystallization of the basic mass of the catalyst and cooling thereof from the temperature of 1,600° C. to 1,000° C. at which temperature a stable crystalline shell of the catalyst granules is formed. The crystalline shell of the catalyst granules may be formed at a temperature within the range of from 1,200° to 900° C. Yet cooling should be conducted to the temperature of 1,000° C., since the crystalline shell of the catalyst granules formed at the temperature of 1,200° C. is instable and results in a changed shape of the catalyst particles in the subsequent stages of its manufacture and the crystalline shell of the catalyst granules corresponding to the temperature of 900° C. has microcrackings which might result in further breaking of the catalyst granules.

The character of movement and cooling of the catalyst under the granulation conditions according to the process of the present invention results in the production of the catalyst granules of mainly coarse-size fractions (5–7 mm, 7–10 mm) necessary for the use in large-size apparatus for the synthesis of ammonia.

After the granulation stage the catalyst is continuously passed to the heat-insulated reactor. In the heat-insulated reactor the granules are continuously moving by gravity downwards while spontaneously cooling from the temperature of 1,000° to 50° C. In the temperature zone of 1,000°–800° C. the catalyst granules are kept for some time. This operation is caused by the necessity of creation of such conditions (temperature drop from 1,000° to 800° C.) under which a further stabilization of the catalyst structure occurs along with its strengthening due to the removal of the inner thermal stresses formed during cooling at the preceding stage.

The resulting spherical-shape catalyst for the synthesis of ammonia upon its use in columns for the synthesis of ammonia results in a reduced hydraulic resistance of the catalyst bed of the column packing, a more uniform distribution of the gas and a reduced content of iron in the product ammonia, thus contributing to a higher efficiency of the unit on the whole. The use of such catalyst in the synthesis columns causes an increase in the output by 5 to 10%.

Thereafter, within the temperature zone of from 800° to 450° C. the catalyst is subjected to a direct reduction by means of a reducing gas.

As the reducing gas use may be made of a hydrogen-nitrogen mixture of the following composition, percent by volume: $H_2$—75, nitrogen—25; a purging gas from the synthesis of ammonia containing, percent by volume: $H_2$—65, $N_2$—15, $CH_4$ 9 2, Ar—8, $NH_4$—10; a converted gas containing, percent by volume: CO—4, $CO_2$—3, $H_2$—78, $N_2$—15.

The utilization of the heat from the catalyst being cooled makes it possible to lower the production costs of the resulting reduced catalyst by 30%, and its use in the synthesis columns reduces their shut-down time (or idle time) by 3–7 days depending on the unit capacity of a column. Then the reduced catalyst is cooled and passivated with nitrogen containing 1% of $O_2$ by volume.

The amount of the catalyst continuously passed to the top section of the reactor is equal to the amount of the catalyst discharged from the lower section of the reactor.

In the bottom section of the heat-insulated reactor there is provided a continuous-action discharging device through which device the final catalyst is continuously discharged from the reactor, screened to fractions and packed into drums.

For a better understanding of the present invention, some specific examples illustrating the process for the production of a granulated catalyst for the synthesis of ammonia are given hereinbelow.

EXAMPLE 1

In the oxidizing chamber iron is placed in small-size lumps onto the bottom, heated by means of the gas burner to the temperature of 1,400° C. and then oxygen in the amount of 60 sm$^3$/hr is admitted into the chamber. After the formation of a melt over the entire surface of the chamber bottom with the layer thickness of 30 mm and stabilization of the melt flow rate through the tapping hole, the iron and promoters dispensers are switched on. Iron is fed in the amount of 87 kg/hr; promoters $K_2CO_3$, CaO and $Al_2O_3$ in the weight ratio therebetween of 1:3:4 respectively are fed in the amount of 9.6 kg/hr. The resulting melt in the amount of 120 kg/hr is continuously fed to granulation which is effected by means of a current of air under the pressure of 25 mm $H_2O$ ensuring the horizontal movement of the resulting granules and cooling thereof to the temperature of 1,000° C. After the stage of granulation the catalyst granules in the amount of 120 kg/hr are continuously fed to a heat-insulated reactor, wherein the granules are continuously moved by gravity downwards with a gradual decrease in temperature from 1,000° to 50° C.

Within the zone of temperatures from 1,000° to 800° C. the resulting catalyst granules are kept for some time, whereafter the catalyst is subjected to a direct reduction in a zone of temperatures of from 800° to 450° C. using a reducing gas of the following composition, % by volume: $H_2$—75, $N_2$—25, at the space velocity $w$—2,000 $hr^{-1}$ to give 90 kg/hr of a reduced catalyst with the reduction degree of 65% which is then passivated with nitrogen containing 1 vol.% of $O_2$ at the space velocity of 2,000 $hr^{-1}$.

Given hereinbelow are comparative data illustrating tests of the catalyst according to the present invention and that of the prior art.

| Catalyst | Yield of fraction 7–10 mm, % | Durability kg/cm² | Output of liquid ammonia from 1 m³ of the catalyst, ton | Degree of reduction at $w = 2,000$ $hr^{-1}$ % |
|---|---|---|---|---|
| According to USSR Inventor's Certificate No. 476018 | 30 | 400 | 40 | |
| Catalyst produced by the process of the present invention | 40 | 420 | 44 | 65 |

EXAMPLE 2

In the oxidizing chamber iron is placed onto the bottom in small-size lumps and heated by a gas-burner to the temperature of 1,400° C., whereafter oxygen is fed thereinto in the amount of 90 sm³/hr. After the formation of a melt over the entire area of the chamber bottom surface in a layer with the thickness of 50 mm and stabilization of the melt flow rate through the tapping hole, dispensers of iron and promoters are switched on. Iron is fed in the amount of 125 kg/hr and promoters $K_2CO_3$, CaO and $Al_2O_3$ at the weight ratio therebetween of 1:3:4 respectively are fed in the amount of 14,4 kg/hr. The resulting melt of the catalyst mass in the amount of 180 kg/hr is continuously passed to granulation which is effected by means of a current of air under the pressure of 25 mm $H_2O$ ensuring a horizontal movement of the granules and cooling thereof to the temperature of 1,000° C. After the stage of granulation the catalyst granules in the amount of 180 kg/hr are continuously fed to a heat-insulated reactor, wherein the granules are continuously moved by gravity downwardly while continuously lowering their temperature from 1,000° to 50° C. Within the zone of temperatures from 1,000° to 800° C. the resulting catalyst granules are kept for some time and then within the zone of temperatures of from 800° to 450° C. the catalyst is directly reduced by means of the reducing gas having the following composition, percent by volume: $H_2$—75, $N_2$—25, supplied at the space velocity of 2,000 $hr^{-1}$. There are produced 130 kg/hr of a reduced catalyst with the degree of reduction of 65% which is then passivated with nitrogen containing 1 vol.% of oxygen at the space velocity $w$ 2,000 $hr^{-1}$. The comparative test results for the catalyst are the same as in the foregoing Example 1.

EXAMPLE 3

In the oxidizing chamber iron is placed onto the chamber bottom in small-size lumps and then heated by a gas burner to the temperature of 1,400° C. whereafter oxygen is admitted into the furnace at the rate of 120 sm³/hr. After the formation of the melt over the entire chamber bottom surface in a layer with the thickness of 70 mm and stabilization of the melt flow rate through the tapping hole, dispensers of iron and promotors are switched on. Iron is supplied in the amount of 174 kg/hr, the promoters—$K_2CO_3$, CaO and $Al_2O_3$ are supplied in the amount of 19.2 kg/hr (the weight ratio between the promoters is 1:3:4 respectively). The resulting melt in the amount of 240 kg/hr is continuously fed to granulation which is effected by means of a current of air under the pressure of 30 mm $H_2O$ ensuring a horizontal movement of the granules and cooling thereof to the temperature of 1,000° C. After the stage of granulation the catalyst granules in the amount of 240 kg/hr are continuously passed to a heat-insulated reactor, wherein the granules are continuously moving by gravity downwardly while lowering their temperature from 1,000° to 50° C. Within the temperature zone of from 800° to 450° C. the catalyst is directly reduced by a reducing gas having the following composition, percent by volume: $H_2$—75, $N_2$—25 supplied at the rate of $w=2,000$ $hr^{-1}$. There are obtained 190 kg/hr of a reduced catalyst with the degree of reduction of 65% which is then passivated with nitrogen containing 1 vol.% of oxygen supplied at the space velocity $w=2,000$ $hr^{-1}$. The test results for the catalyst are given hereinbelow.

| Yield of 7–10 mm fraction, % | Durability kg/cm² | Output of liquid ammonia from 1 m³ of the catalyst, ton | Degree of reduction at $w = 2,000$ $hr^{-1}$, % |
|---|---|---|---|
| 30 | 410 | 44 | 65 |

EXAMPLE 4

The process is carried out in a manner similar to that described in the foregoing Example 1, except that the reduction is effected at a space velocity of 20,000 $hr^{-1}$; the degree of reduction of the catalyst is 25%.

EXAMPLE 5

The process is carried out as described in Example 1 hereinbefore, except that the reduction is conducted at the space velocity of 30,000 $hr^{-1}$ and the degree of reduction of the catalyst is 15%.

EXAMPLE 6

The process is conducted in a manner similar to that described in Example 1, except that use is made of purging gases resulting from the production of ammonia and having the following composition, volume percent: $H_2$—65, $N_2$—15, $CH_4$—2, Ar—8, $NH_3$—10.

EXAMPLE 7

The process is carried out as described in Example 1, except that use is made of the gas containing, percent by volume:—CO—4, $CO_2$—3, $H_2$—78, $N_2$—15.

What is claimed is:

1. A process for producing a granular catalyst for the synthesis of ammonia which comprises simultaneous melting and oxidation of iron with the use of a promoter selected from the group consisting of potassium carbonate, calcium oxide, alumina and mixtures thereof in a melt layer of 30 to 70 mm thickness of the resulting catalyst mass, followed by granulating said melt with a current of air ensuring a horizontal movement of the resulting catalyst granules and cooling them to a temperature of 1,000° C. and then reducing the resulting granules as they cool spontaneously with a reducing gas.

2. A process according to claim 1, wherein said granulation of the catalyst mass melt is effected in a current of air under a pressure of from 25 to 30 mm of water column.

3. A process according to claim 1, wherein as the reducing gas use is made of a hydrogen-nitrogen mixture containing 75% by volume of hydrogen and 25% by volume of nitrogen.

4. A process according to claim 1 or 2, wherein as the reducing gas use is made of a purging gas from the production of ammonia containing $H_2$—65 vol.%, $N_2$—15 vol.%, $CH_4$—2 vol.%, Ar—8 vol.%, $NH_3$—10 vol.%.

5. A process according to claim 1 or 2, wherein as the reducing gas use is made of a converted gas from the synthesis of ammonia containing CO—4 vol.%, $CO_2$—3 vol.%, $H_2$—78 vol.% and $N_2$—15 vol.%.

* * * * *